United States Patent
Tamura

(10) Patent No.: US 10,324,751 B2
(45) Date of Patent: Jun. 18, 2019

(54) INFORMATION PROCESSING APPARATUS, INFORMATION PROCESSING METHOD, AND NON-TRANSITORY COMPUTER-READABLE RECORDING MEDIUM RECORDING INFORMATION PROCESSING PROGRAM

(71) Applicant: FUJITSU LIMITED, Kawasaki-shi, Kanagawa (JP)

(72) Inventor: Yuto Tamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 177 days.

(21) Appl. No.: 15/467,335

(22) Filed: Mar. 23, 2017

(65) Prior Publication Data

US 2017/0322830 A1 Nov. 9, 2017

(30) Foreign Application Priority Data

May 6, 2016 (JP) .................................. 2016-093302

(51) Int. Cl.
*G06F 9/48* (2006.01)
*G06F 9/46* (2006.01)

(52) U.S. Cl.
CPC ............ *G06F 9/4806* (2013.01); *G06F 9/467* (2013.01)

(58) Field of Classification Search
None
See application file for complete search history.

(56) References Cited

U.S. PATENT DOCUMENTS

| 2008/0120298 A1 | 5/2008 | Duffy et al. |
| 2008/0120484 A1 | 5/2008 | Zhang et al. |
| 2014/0115249 A1 | 4/2014 | Jacobi et al. |
| 2016/0154677 A1* | 6/2016 | Bank .................. G06F 13/4239 718/105 |
| 2017/0083364 A1* | 3/2017 | Zhao ..................... G06F 9/4818 |
| 2017/0083365 A1* | 3/2017 | Zhao ..................... G06F 9/4881 |

FOREIGN PATENT DOCUMENTS

| JP | 2010-510590 | 4/2010 |
| JP | 2014-085839 | 5/2014 |

* cited by examiner

*Primary Examiner* — Wynuel S Aquino
(74) *Attorney, Agent, or Firm* — Fujitsu Patent Center

(57) ABSTRACT

An information processing apparatus includes: a memory configured to store an information processing program; and a plurality of processor cores configured to acquire and execute a task from a storage region which is provided for each of the processor cores and including a first processor core configured to execute the information processing program, wherein the first processor core: performs, in work steal in which a task stored in a storage region of the first processor core is acquired by a second processor core, a writing process for an abort region, which is provided corresponding to the task, for detecting access contention by the first processor core and the second processor core using a transactional memory function; and performs a reading process for the abort region when the task is to be acquired from the storage region.

6 Claims, 17 Drawing Sheets

INFORMATION PROCESSING APPARATUS, INFORMATION PROCESSING METHOD, AND NON-TRANSITORY COMPUTER-READABLE RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2016-093302, filed on May 6, 2016, the entire contents of which are incorporated herein by reference.

FIELD

The embodiment relates to an information processing apparatus, an information processing method, and a non-transitory computer-readable recording medium recording an information processing program.

BACKGROUND

A task (process) is controlled using a hardware transactional memory (hereinafter referred to as "HTM") or a software transactional memory (hereinafter referred to as "STM").

A related art is disclosed in Japanese Laid-open Patent Publication No. 2014-085839 or Japanese National Publication of International Patent Application No. 2010-510590.

SUMMARY

According to an aspect of the embodiment, an information processing apparatus includes: a memory configured to store an information processing program; and a plurality of processor cores configured to acquire and execute a task from a storage region which is provided for each of the processor cores and including a first processor core configured to execute the information processing program, wherein the first processor core: performs, in work steal in which a task stored in a storage region of the first processor core is acquired by a second processor core, a writing process for an abort region, which is provided corresponding to the task, for detecting access contention by the first processor core and the second processor core using a transactional memory function; and performs a reading process for the abort region when the task is to be acquired from the storage region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

For example, an execution order of tasks is controlled using an HTM.

For example, if access contention occurs, a task to be executed is determined based on a priority order using an STM.

For example, in task scheduling of a multicore system, a storage region for a task is provided and scheduling is performed for each processor core (hereinafter referred to simply as "core"). Where each core does not have a task stored in a storage region for a task of the core itself, a task is acquired from a storage region for a task of a core other than the core itself and is executed such that load dispersion is performed. To acquire, in a case where each core does not have a task stored in a storage region for a task of the itself core, a task from a storage region for a task of a core other than the core itself is hereinafter referred to as "work steal." In this manner, in the work steal, a core other than a core to which a task is allocated in task scheduling executes the task. Therefore, the execution efficiency of the task may be deceased by decrease of the cache hit rate upon task execution or the like.

For example, when work steal is performed, execution of a task may be controlled.

For example, the work steal is performed in a multicore system including two cores.

Figure 1:
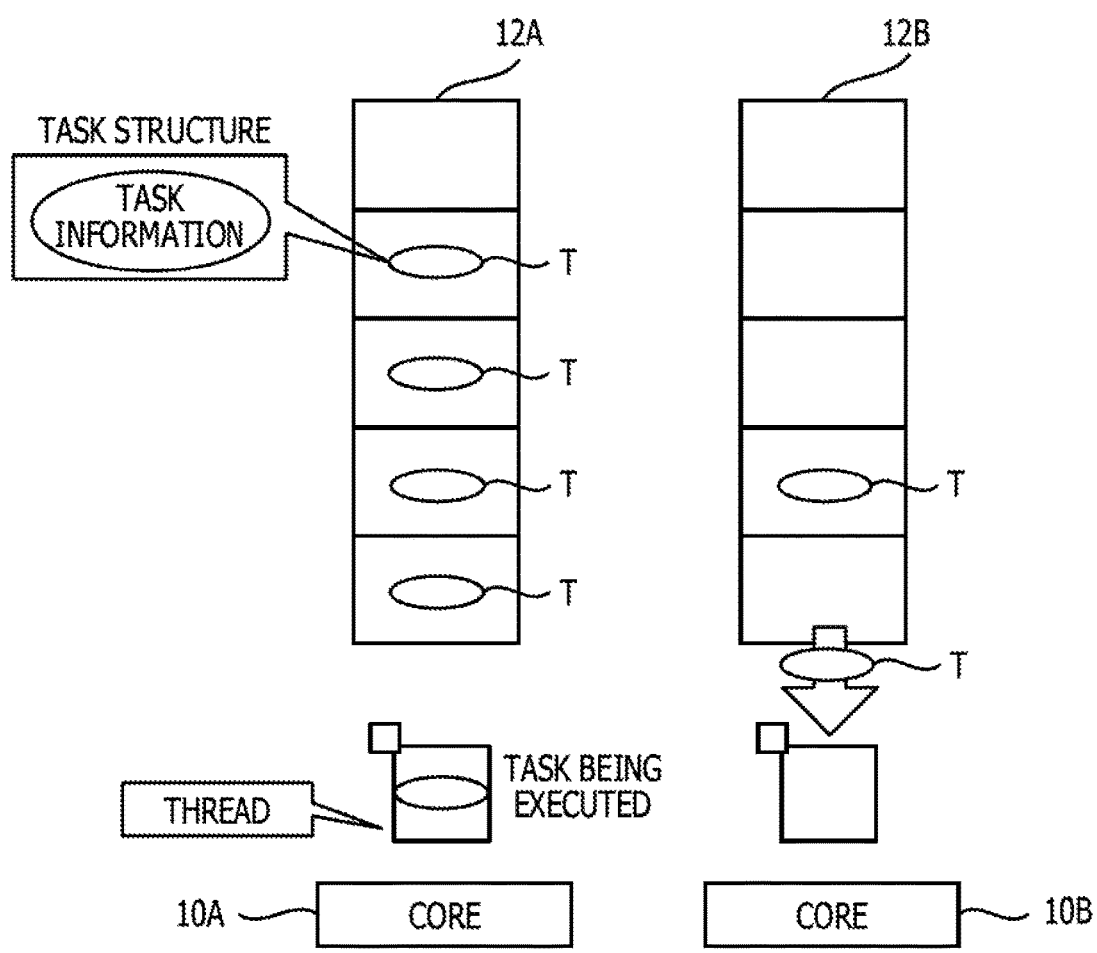
FIG. 1 depicts an example of task execution.

FIG. 1 depicts an example of task execution. In FIG. 1, a core acquires a task from a task queue and executes the task. As depicted in FIG. 1, a task queue 12A as an example of a storage region in which tasks T that are an acquisition target by a thread allocated to a core 10A are stored is provided corresponding to the core 10A. The task queue 12A is provided in a memory region of a memory or the like, and a task T is stored, for example, as a task structure including task information in the task queue 12A. The task information includes, as an example, a command to be executed and information for execution of the task T such as an argument of the command.

Similarly, a task queue 12B in which tasks T that are an acquisition target by a thread allocated to a core 10B are stored is provided corresponding to the core 10B. In the following description, where the core 10A and the core 10B are collectively referred to, they are referred to as "core 10," and, where the task queue 12A and the task queue 12B are collectively referred to, they are referred to as "task queue 12." That a thread allocated to a core 10 acquires a task T is hereinafter represented as the core 10 acquires the task T omitting the term "thread" in order to avoid confusion.

Similarly, that a thread allocated to a core 10 executes a task T is represented as the core 10 executes the task T omitting the term "thread."

The task queue 12 may include a first in, first out (FIFO) by which tasks T are acquired in an order in which the tasks T are stored. As depicted in FIG. 1, each core 10 acquires and executes a task T from the top (bottom in FIG. 1) of a task queue 12 corresponding to each of the cores 10.

Figure 2:
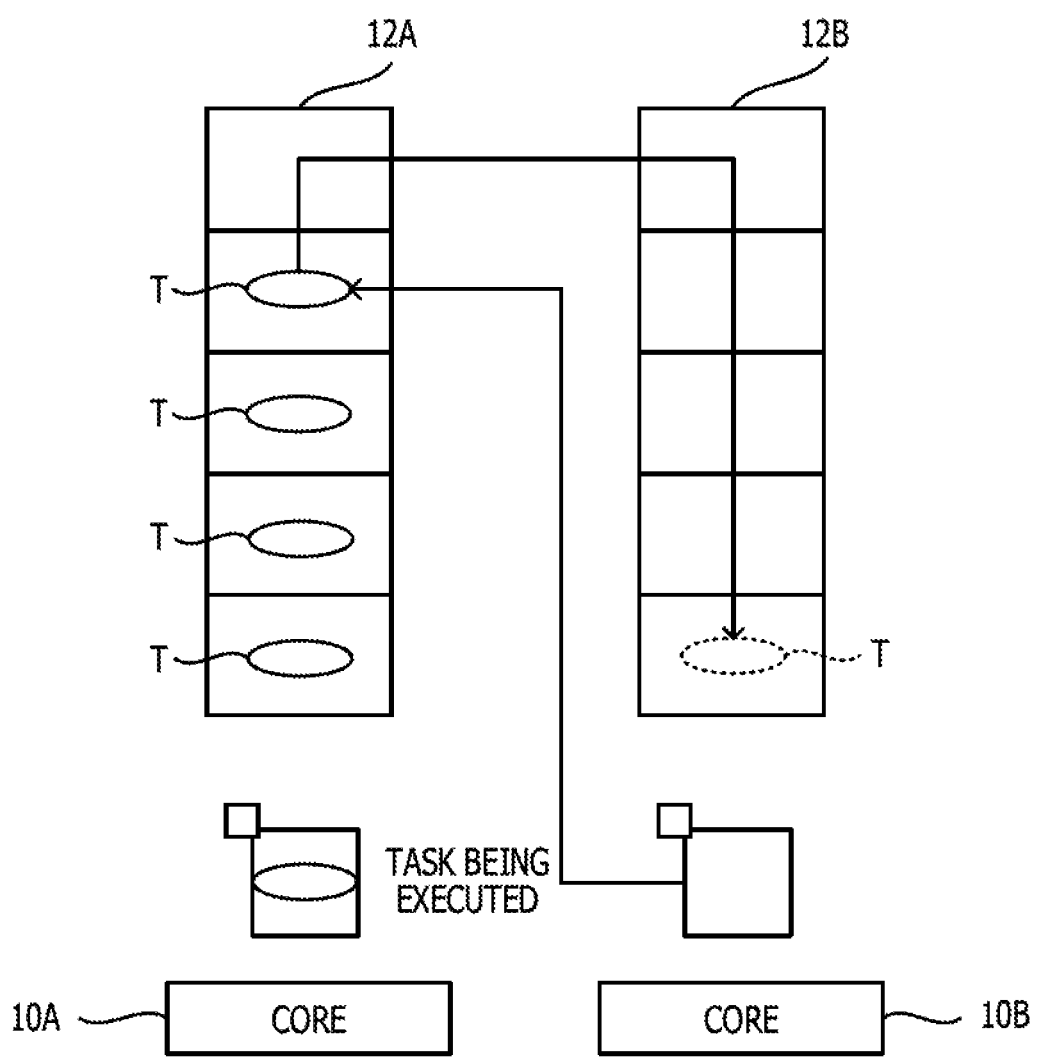
FIG. 2 depicts an example of work steal.
Figure 3:
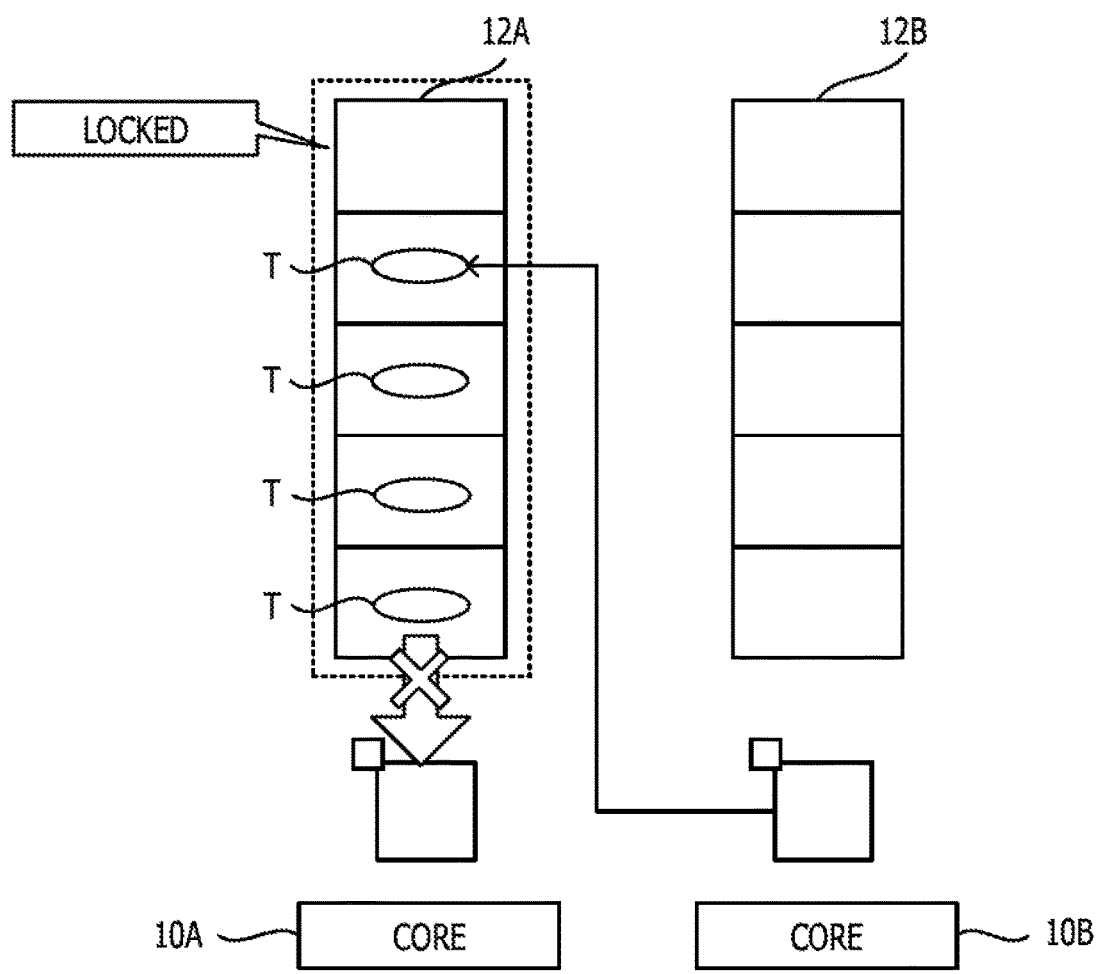
FIG. 3 depicts an example of exclusive control of a task queue.
Figure 4:
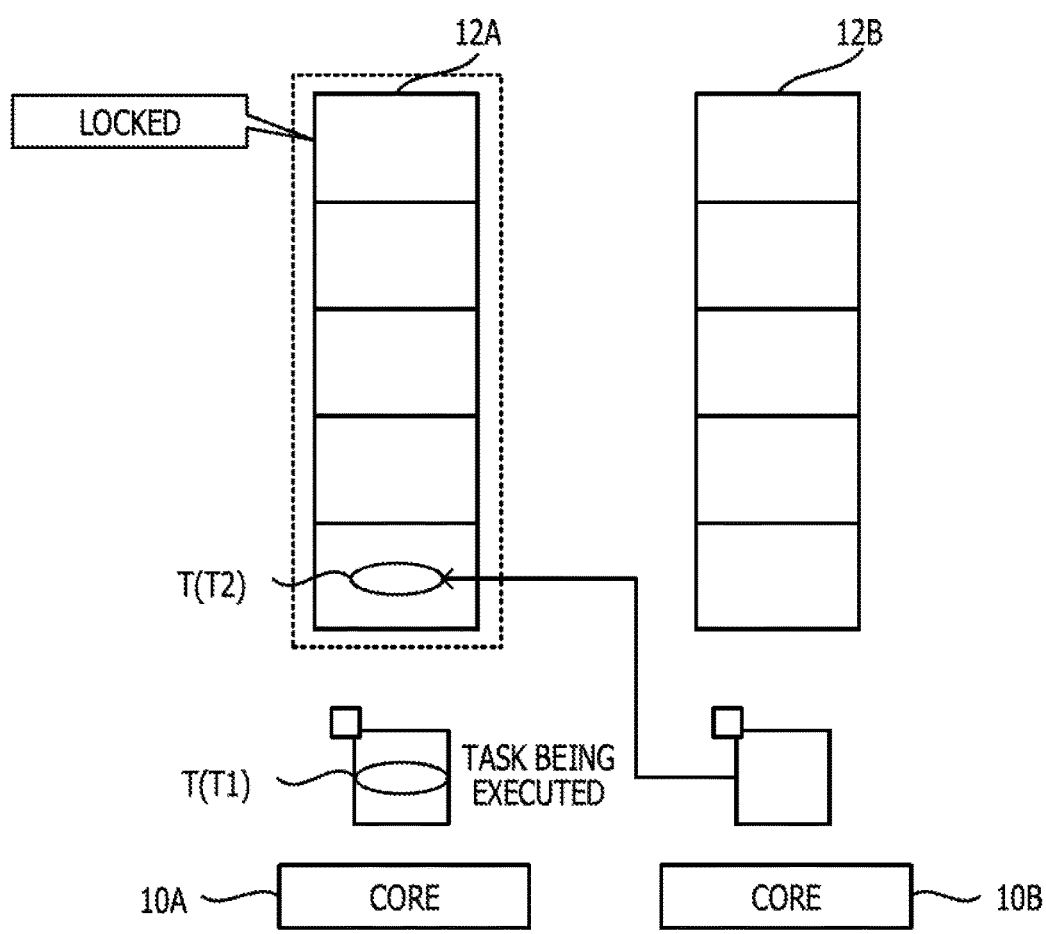
FIG. 4 depicts an example of work steal.
Figure 5:
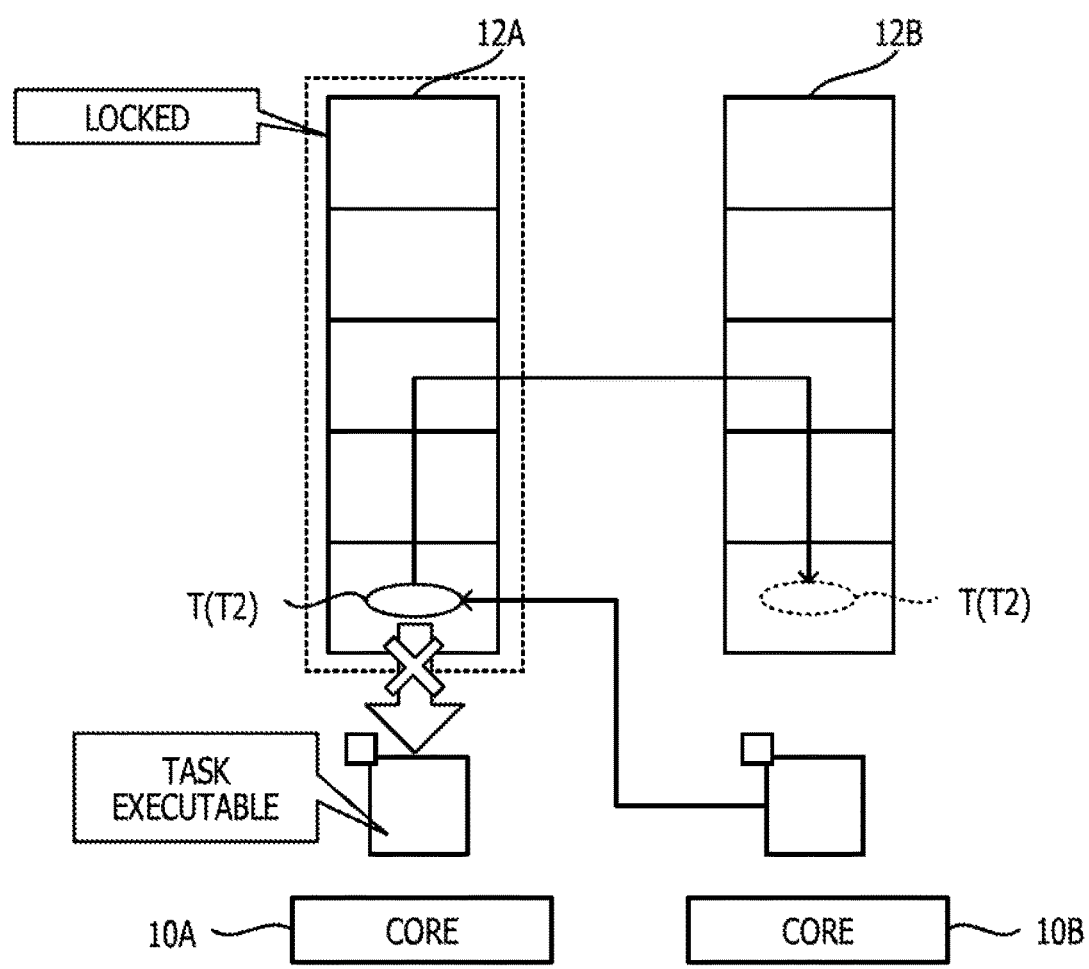
FIG. 5 depicts an example of work steal.

FIGS. 2, 4, and 5 depict examples of work steal. FIG. 3 depicts an example of exclusive control of a task queue. In FIGS. 2 and 3, as an example, the core 10B is a core performing work steal and the core 10A is a core from which the work steal is performed.

As depicted in FIG. 2, where no task T is stored in the task queue 12B of the core 10B, the core 10B performs work steal for acquiring a task T from the task queue 12A of the core 10A and executes the acquired task T. Consequently, load dispersion between the respective cores 10 is implemented.

The exclusive control is performed by the task queues 12 such that the same task T is not executed by a plurality of cores 10 at the same time. As depicted in FIG. 3, the task queue 12A is locked within a period when the core 10B performs the work steal from the core 10A. For example, within a period when the core 10B performs work steal from the core 10A, the core 10A does not acquire a task T of the task queue 12A even if the core 10A is in a state in which the core 10A may execute the task T.

As depicted in FIG. 4, during execution of a task T1 by the core 10A in a state in which one task T2 is stored in the task queue 12A of a first core, for example, of the core 10A, a second core, for example, the core 10B, performs work steal. In this case, the task queue 12A is locked within a period when the core 10B performs the work steal from the core 10A as described above.

For example, if the core 10A ends execution of the task T1 and is placed into a state in which a new task may be executed within a period when the second core, for example, the core 10B, performs work steal from the first core, for example, from the core 10A, the core 10A is not permitted to acquire the task T2 from the task queue 12A as depicted in FIG. 5. Accordingly, the task T2 is executed by the core 10B. However, where the task T2 has a relation to the task T1 or in a like case, if the task T2 is executed by the core 10A, the possibility that the hit rate of a cache memory may be higher is high compared with the case in which the task T2 is executed by the core 10B, and the task may be ended earlier.

Therefore, for example, where a state enters the state depicted in FIG. 5, if the work steal by the core 10B is abnormally ended and the task T2 is executed by the core 10A, the decrease of the execution efficiency of the task may be suppressed when work steal is performed.

Figure 6:
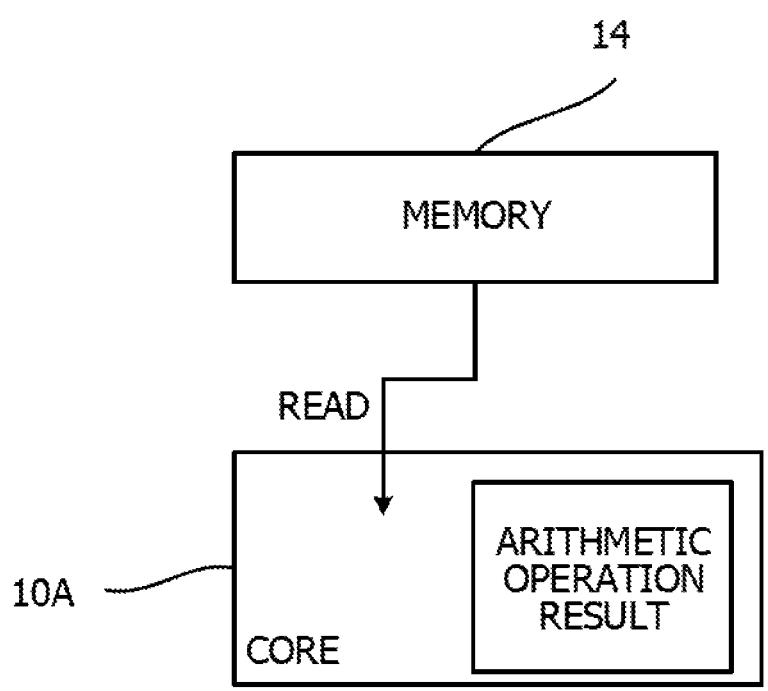
FIG. 6 depicts an example of an HTM function.
Figure 7:
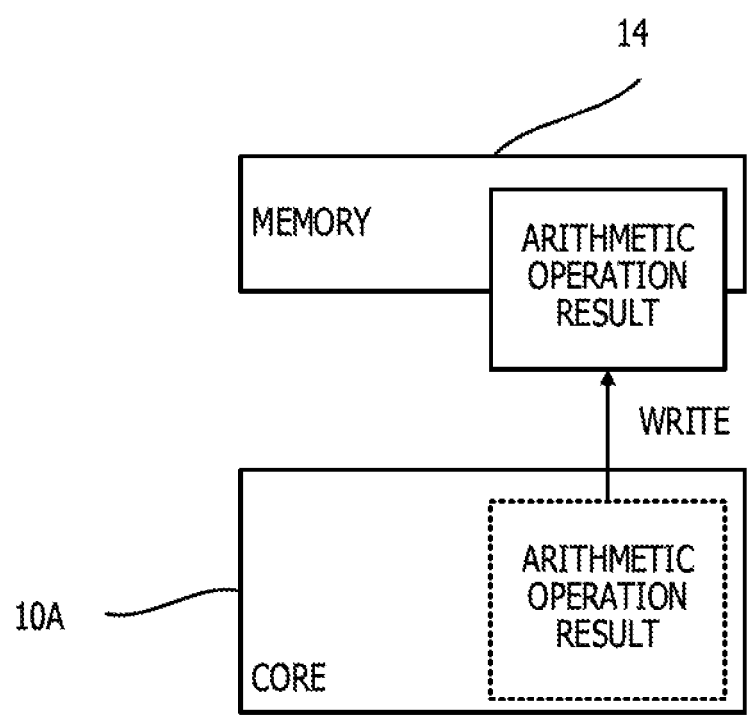
FIG. 7 depicts an example of an HTM function.

FIGS. 6 and 7 depict examples of an HTM function. As depicted as an example in FIG. 6, the core 10A reads out data of a processing target from a memory 14 and starts a transaction. Further, after the transaction is started, during execution of a process of a critical section, the core 10A retains a result of an arithmetic operation into the core 10A without reflecting the result on the memory 14. As an example, when the process of the critical section comes to an end, the core 10A writes the result of the arithmetic operation obtained as a result of the process into the memory 14 as depicted in FIG. 7 and then ends the transaction.

Further, if access contention with a different core is detected during execution of the process of the critical section, the core 10A abnormally ends (aborts) the transaction thereby to maintain consistency of the data. For example, the exclusive controlling method by the HTM function may be an exclusive controlling method not by a starting order of processes but by a detection order of access contention.

Conditions for performing an abort process with the HTM function includes three conditions as described below as an example.

(1) Into at least one of addresses (for example, read-set) of a memory region from which reading has been performed by any core itself, a different core performs writing.

(2) Into at least one of addresses (for example, write-set) of a memory region into which writing is to be performed by any core itself, a different core performs writing.

(3) From at least one of addresses of a memory region into which writing is to be performed by any core itself, a different core performs reading.

As an example, the work steal may be abnormally ended using the condition of (3).

Figure 8:
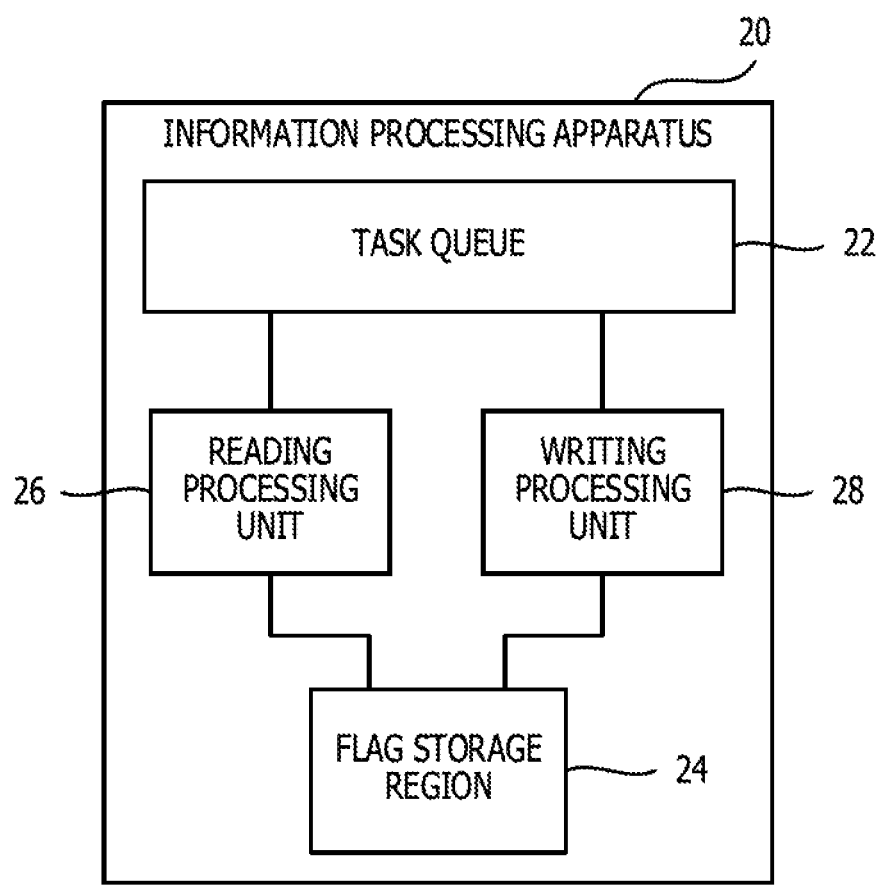
FIG. 8 depicts an example of a functional configuration of an information processing apparatus.

FIG. 8 depicts an example of a functional configuration of an information processing apparatus. As depicted in FIG. 8, an information processing apparatus 20 includes a task queue 22, a flag storage region 24, a reading processing unit 26, and a writing processing unit 28. The information processing apparatus 20 includes a plurality of cores and the task queue 22 is provided for each core. Each task queue 22 is a storage region that is provided, for example, in a memory region of a memory or the like and in which tasks to be executed by a corresponding core are stored.

Figure 9:
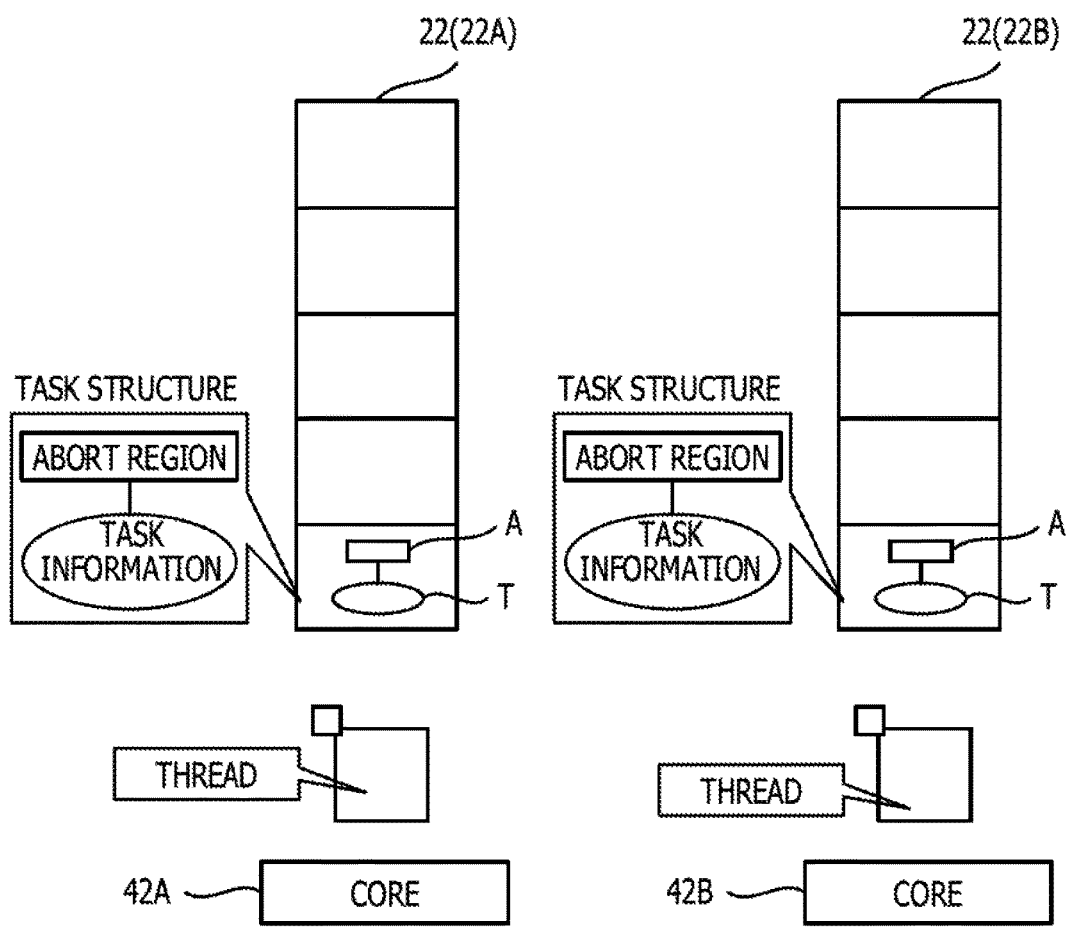
FIG. 9 depicts an example of a task queue.

FIG. 9 depicts an example of a task queue. As depicted in FIG. 9, each of cores 42 uses a given memory region prepared for each task T of the task queue 22 corresponding to each of the cores 42 as an abort region A. The abort region A is a region for detecting access contention by the respective cores 42 using the HTM function. It is to be noted that, in the following description, where a task queue 22 is described distinctly for each core, an alphabet similar to the alphabet at the tail end of the reference character of the core is added to the tail end of reference character. For example, the core 42A acquires and executes a task T from the task queue 22A and the core 42B acquires and executes another task T from the task queue 22B. In the following description, where the core 42A and the core 42B are collectively referred to, they are referred to as "core 42." In the following description, in order to avoid confusion, a core that performs work steal may be referred to as "second core 42" and a core that acquires the task T from the own task queue 22 of the core itself and executes the task T may be referred to as "first core 42."

The flag storage region 24 stores a flag F that is provided for each core 42 and in which information indicating whether or not a transaction is being executed by the reading processing unit 26 is set. As an example, when a transaction is being executed by the reading processing unit 26, "1" is set to the flag F. As an example, when a transaction is not executed as yet (not being executed) by the reading processing unit 26, "0" is set to the flag F. Further, an initial value of the flag F may be set to "0."

The reading processing unit 26 starts a transaction using the HTM function the first core 42 has. As an example, the reading processing unit 26 starts a transaction using a transactional synchronization extensions (TSX) instruction (for example, the XBEGIN instruction) provided by Intel (registered trademark) corporation. When a task T is acquired from the task queue 22 of the first core 42 by the first core 42 after a transaction is started, the reading processing unit 26 performs a reading process for the abort region A provided corresponding to the acquired task T. Before the reading process for the abort region A is performed, the reading processing unit 26 sets the flag F of the first core 42 to "1." After the reading process for the abort region A is performed, the reading processing unit 26 acquires a task T from the task queue 22 of the first core 42. After the task T is acquired, the reading processing unit 26 ends the transaction using the HTM function the first core 42 has. As an example, the reading processing unit 26 ends the transaction using the TSX instruction (for example, the XEND instruction). After the transaction is ended, the reading processing unit 26 sets the flag F of the first core 42 to "0." The reading processing unit 26 executes the acquired task T.

The writing processing unit 28 starts a transaction using the HTM function the second core 42 has. The writing processing unit 28 starts the transaction using the TSX instruction (for example, the XBEGIN instruction). When work steal for acquiring a task T stored in the task queue 22 of the first core 42 is performed by the second core 42 after the transaction is started, the writing processing unit 28 performs a writing process for the abort region A provided corresponding to the task T. For example, the writing processing unit 28 sets an address of the abort region A to write-set. After the writing process for the abort region A is performed, the writing processing unit 28 acquires a task T from the task queue 22 of the first core 42. After the task T is acquired, the writing processing unit 28 ends the transaction using the HTM function the second core 42 has. The writing processing unit 28 ends the transaction using the TSX instruction (for example, the XEND instruction). The writing processing unit 28 executes the acquired task T. If the work steal being executed abnormally ends, the writing processing unit 28 refers to the flag F of the first core 42 corresponding to the task queue 22 in which the task T of the work steal target is stored originally and causes the second core 42 to wait until the flag F becomes "0."

Figure 10:
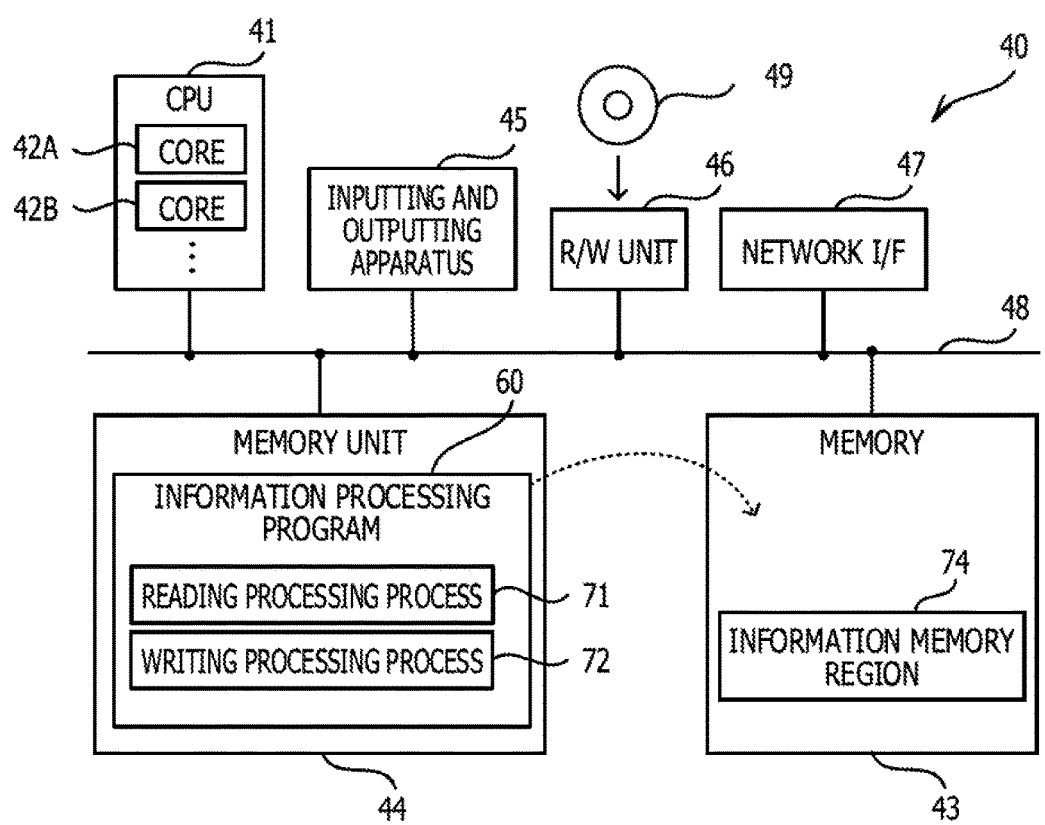
FIG. 10 depicts an example of a computer.

FIG. 10 depicts an example of a computer. The information processing apparatus 20 may be implemented, for example, by a computer 40 depicted in FIG. 10. The computer 40 includes a central processing unit (CPU) 41 including a plurality of cores 42A, 42B and the like, a memory 43 as a temporary memory region, and a nonvolatile memory unit 44. Each of the cores 42 of the CPU 41 has the HTM function. The computer 40 includes an inputting and outputting apparatus 45 such as a displaying apparatus and an inputting apparatus. The computer 40 includes a read/write (R/W) unit 46 that controls reading and writing of data into and from a recording medium 49, and a network interface (I/F) 47 coupled to a network. The CPU 41, the memory 43, the memory unit 44, the inputting and outputting apparatus 45, the R/W unit 46, and the network I/F 47 are coupled to each other through a bus 48.

The memory unit 44 may be implemented by a hard disk drive (HDD), a solid state drive (SSD), a flash memory or the like. An information processing program 60 for causing the computer 40 to function as the information processing apparatus 20 is stored in the memory unit 44 as a storage medium. The information processing program 60 includes a reading processing process 71 and a writing processing process 72. The memory 43 includes an information memory region 74 that functions as the task queues 22 and the flag storage region 24. The information memory region 74 may be provided in the memory unit 44 or may be provided in a cache memory the CPU 41 and the core 42 include.

Each core 42 of the CPU 41 reads out the information processing program 60 from the memory unit 44 and develops the read out program in the memory 43 and then executes processes the information processing program 60 has. By executing the reading processing process 71, each core 42 of the CPU 41 operates as the reading processing unit 26 depicted in FIG. 8. By executing the writing processing process 72, each core 42 of the CPU 41 operates as the writing processing unit 28 depicted in FIG. 8. Consequently, the computer 40 that executes the information processing program 60 functions as the information processing apparatus 20.

A function for acquiring a task T from a task queue 22 and a function for executing the acquired task T from among functions implemented by the reading processing unit 26 are implemented by a function of an operating system (OS). Similarly, also a function for acquiring a task T from the task queue 22 and a function for executing the acquired task T from among functions implemented by the writing processing unit 28 are implemented by the function of the OS. Accordingly, the information processing program 60 may be implemented as part of programs of the OS by performing correction for adding the functions of the reading processing unit 26 and writing processing unit 28 that are not implemented by the function of the OS to the OS.

The functions implemented by the information processing program 60 may be implemented, for example, by a semiconductor integration circuit, for example, by an application specific integrated circuit (ASIC) or the like.

Figure 11:
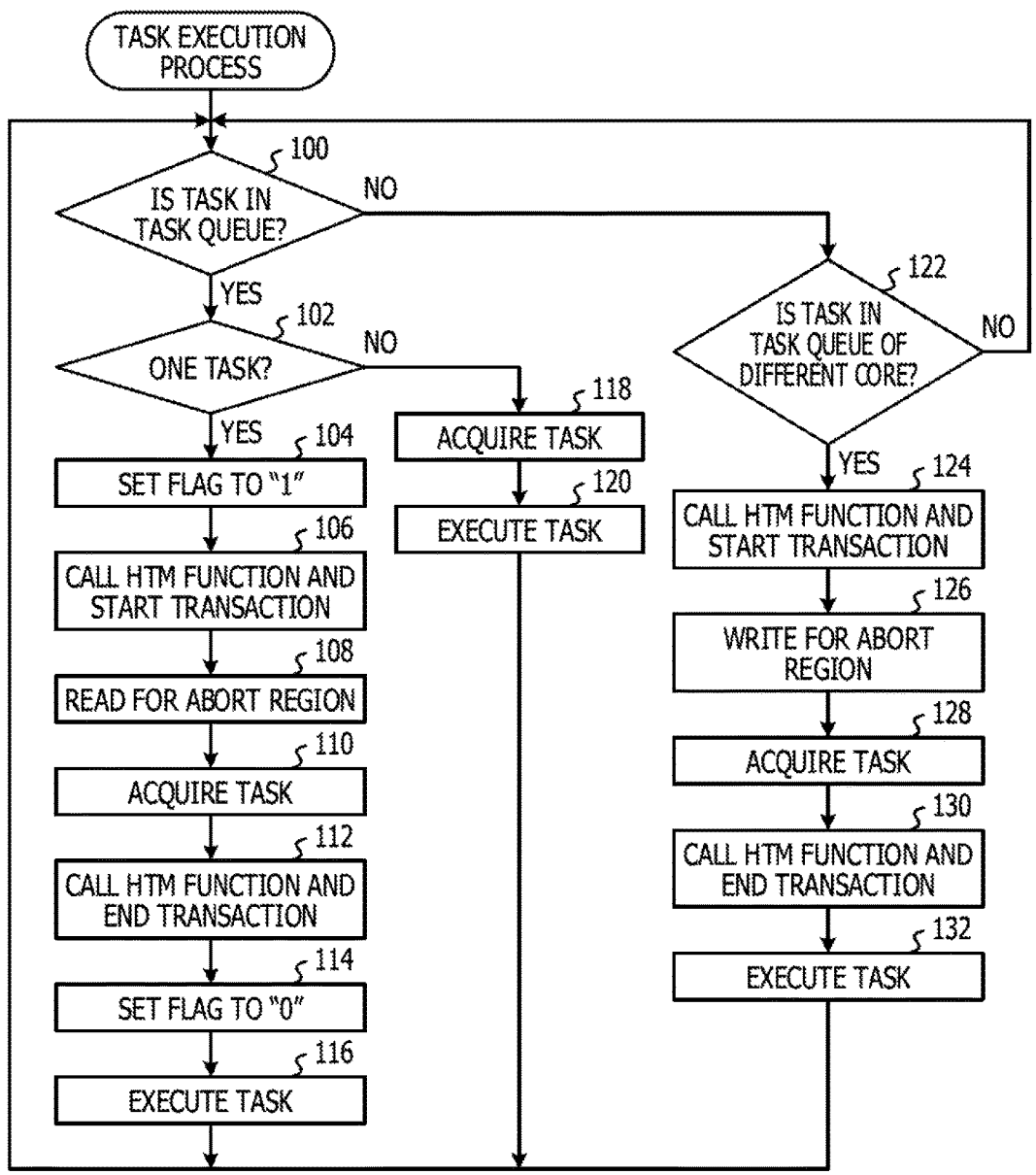
FIG. 11 illustrates an example of a task execution process.
Figure 12:
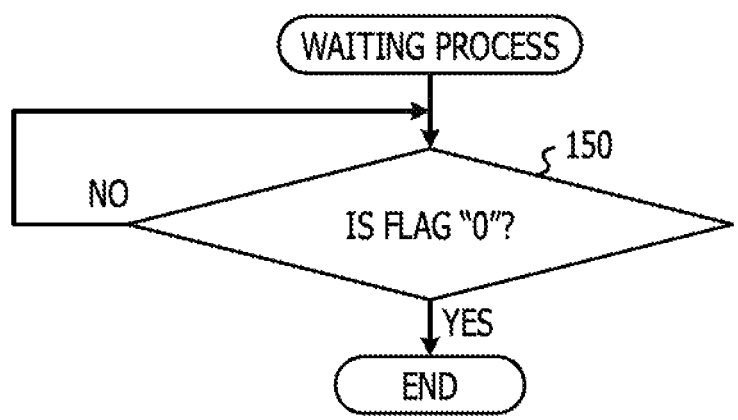
FIG. 12 illustrates an example of a waiting process.

FIG. 11 illustrates an example of a task execution process. FIG. 12 illustrates an example of a waiting process. By the information processing apparatus 20 executing the information processing program 60, the task execution process illustrated in FIG. 11 and the waiting process illustrated in FIG. 12 are executed. Execution of the task execution process illustrated in FIG. 11 is started by each core 42 when the power supply to the information processing apparatus 20 is, for example, placed into an on state and activation of the operating system of the information processing apparatus 20 is completed. Execution of the waiting process illustrated in FIG. 12 is started by the core 42 when work steal abnormally ends within a period when the core 42 performs work steal, for example. The "core 42" signifies a core 42 itself that executes the task execution process and the waiting process. The "task queue 22" signifies a task queue 22 of the core 42 that executes the task execution process and the waiting process. The "flag F" signifies a flag F of the core 42 that executes the task execution process and the waiting process.

In operation 100 of the task execution process depicted in FIG. 11, the reading processing unit 26 decides whether or not a task T is stored in the task queue 22. If a negative decision is made, the process advances to operation 122, but if an affirmative decision is made, the process advances to operation 102.

In operation 102, the reading processing unit 26 decides whether or not the number of tasks T stored in the task queue 22 is one. If a negative decision is made, the process advances to operation 118, but if an affirmative decision is made, the process advances to operation 104. In operation 104, the reading processing unit 26 sets the flag F to "1."

In operation 106, the reading processing unit 26 calls the HTM function of the core 42 to start a transaction. In operation 108, the reading processing unit 26 performs a reading process for the abort region A corresponding to the task T. In operation 110, the reading processing unit 26 acquires the task T from the task queue 22. In operation 112, the reading processing unit 26 calls the HTM function of the core 42 and ends the transaction started in operation 106. By the process in operation 112, the task T acquired in operation 110 is deleted from the task queue 22.

In operation 114, the reading processing unit 26 sets the flag F to "0." In operation 116, after the reading processing unit 26 executes the task T acquired in operation 110 using the core 42, the process returns to operation 100.

In operation 118, the reading processing unit 26 acquires a task T from the task queue 22. In operation 120, after the reading processing unit 26 executes the task T acquired in operation 118, the process returns to operation 100.

In operation 122, the writing processing unit 28 decides whether or not a task T is stored in the task queue 22 of a different core 42. If a negative decision is made, the process returns to operation 100, but if an affirmative decision is made, the process advances to operation 124. The following respective operations are executed taking, as a target (hereinafter referred to as "target task queue 22"), any one of the task queues 22 with regard to which it is decided in operation 122 that a task T is stored.

In operation 124, the writing processing unit 28 calls the HTM function of the core 42 and starts a transaction. In operation 126, the writing processing unit 28 performs a writing process for the abort region A of the task T that is an acquisition target of the target task queue 22. In operation 128, the writing processing unit 28 acquires the task T corresponding to the abort region A for which the writing process is performed in operation 126 from the target task queue 22.

In operation 130, the writing processing unit 28 calls the HTM function of the core 42 and ends the transaction started in operation 124. By the process in operation 130, the task T acquired in operation 128 is deleted from the target task queue 22. In operation 132, after the writing processing unit 28 executes the task T acquired in operation 128 using the core 42, the process returns to operation 100.

In operation 150 of the waiting process depicted in FIG. 12, the writing processing unit 28 decides whether or not the flag F of the core 42 of the target of work steal is "0." The writing processing unit 28 repetitively executes operation 150 until the flag F of the core 42 of the target of the work steal becomes "0," and if an affirmative decision is made in operation 150, the waiting process is ended. After the waiting process comes to an end, the core 42 that has executed the waiting process starts execution of a task execution process.

Figure 13:
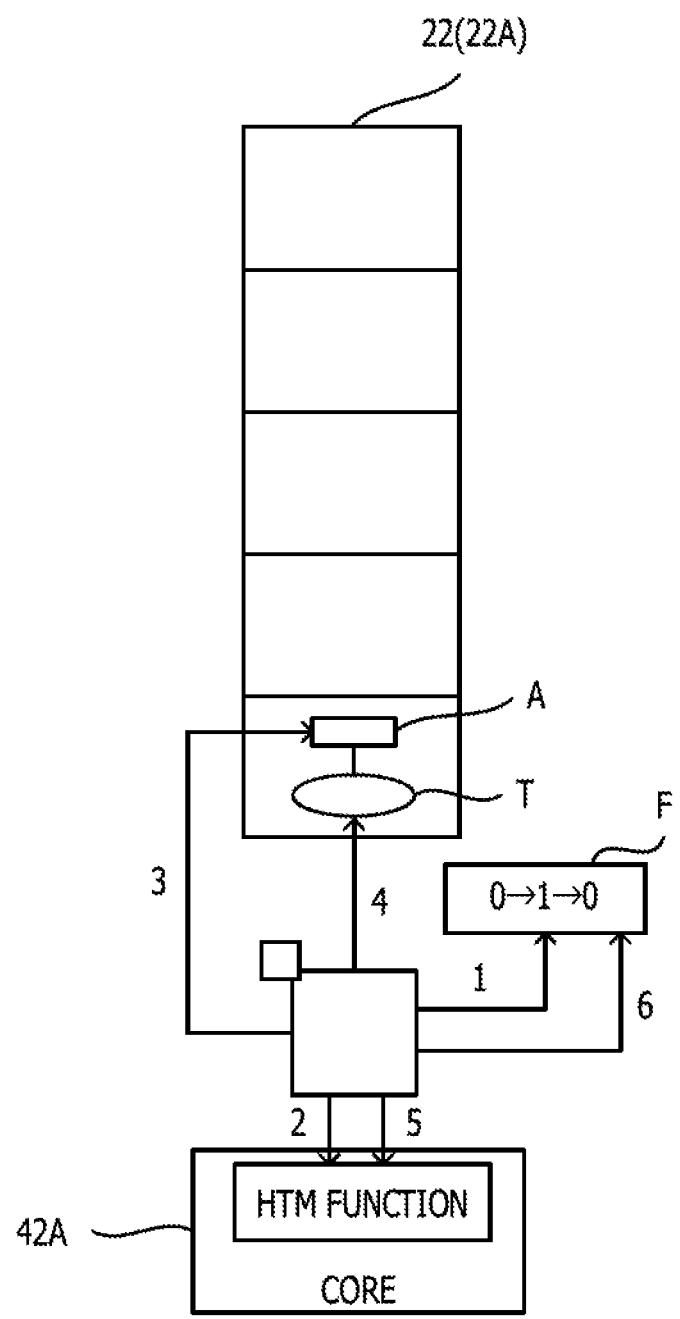
FIG. 13 depicts an example of a task execution process and a waiting process.
Figure 14:
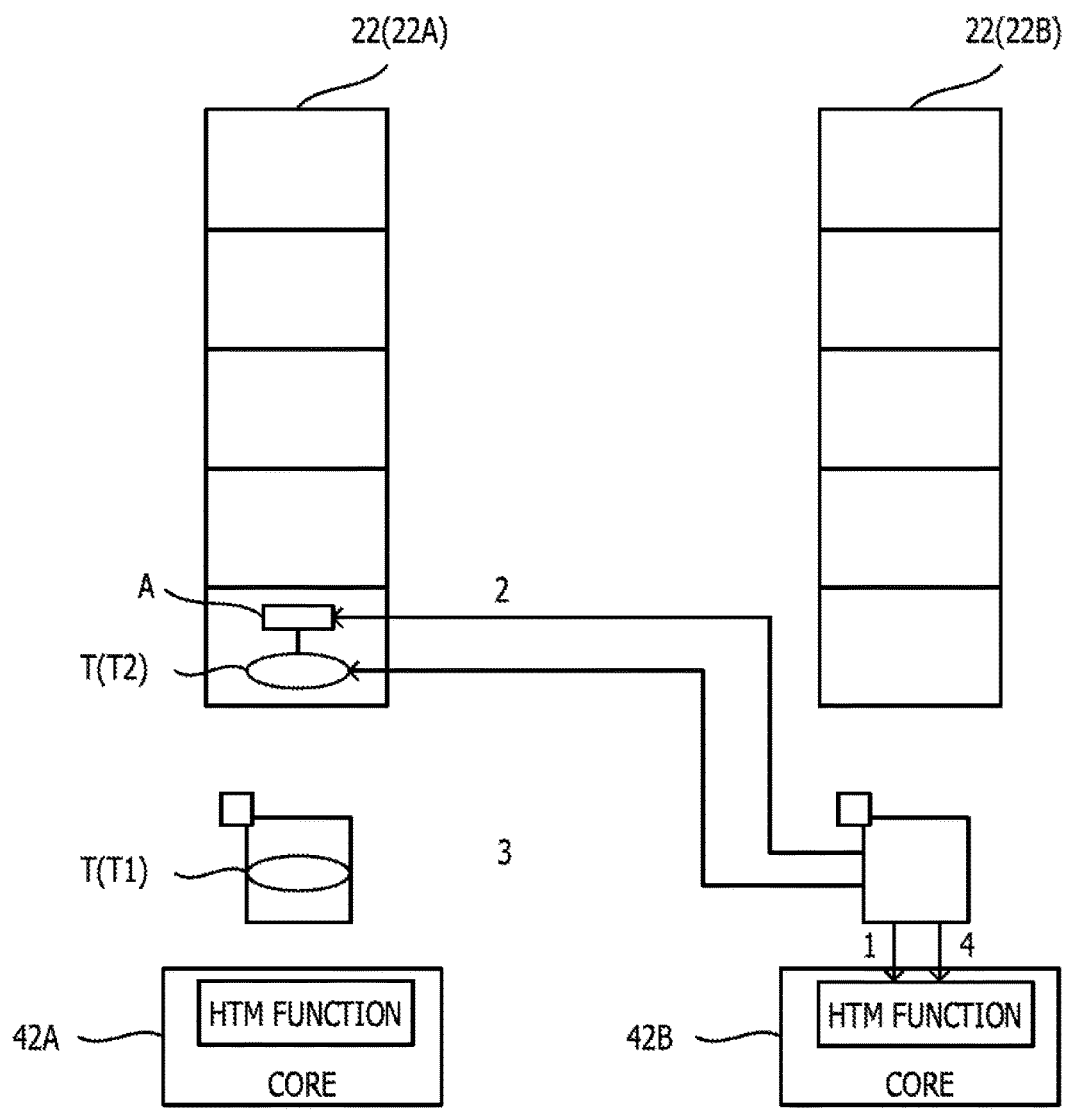
FIG. 14 depicts an example of a task execution process and a waiting process.
Figure 15:
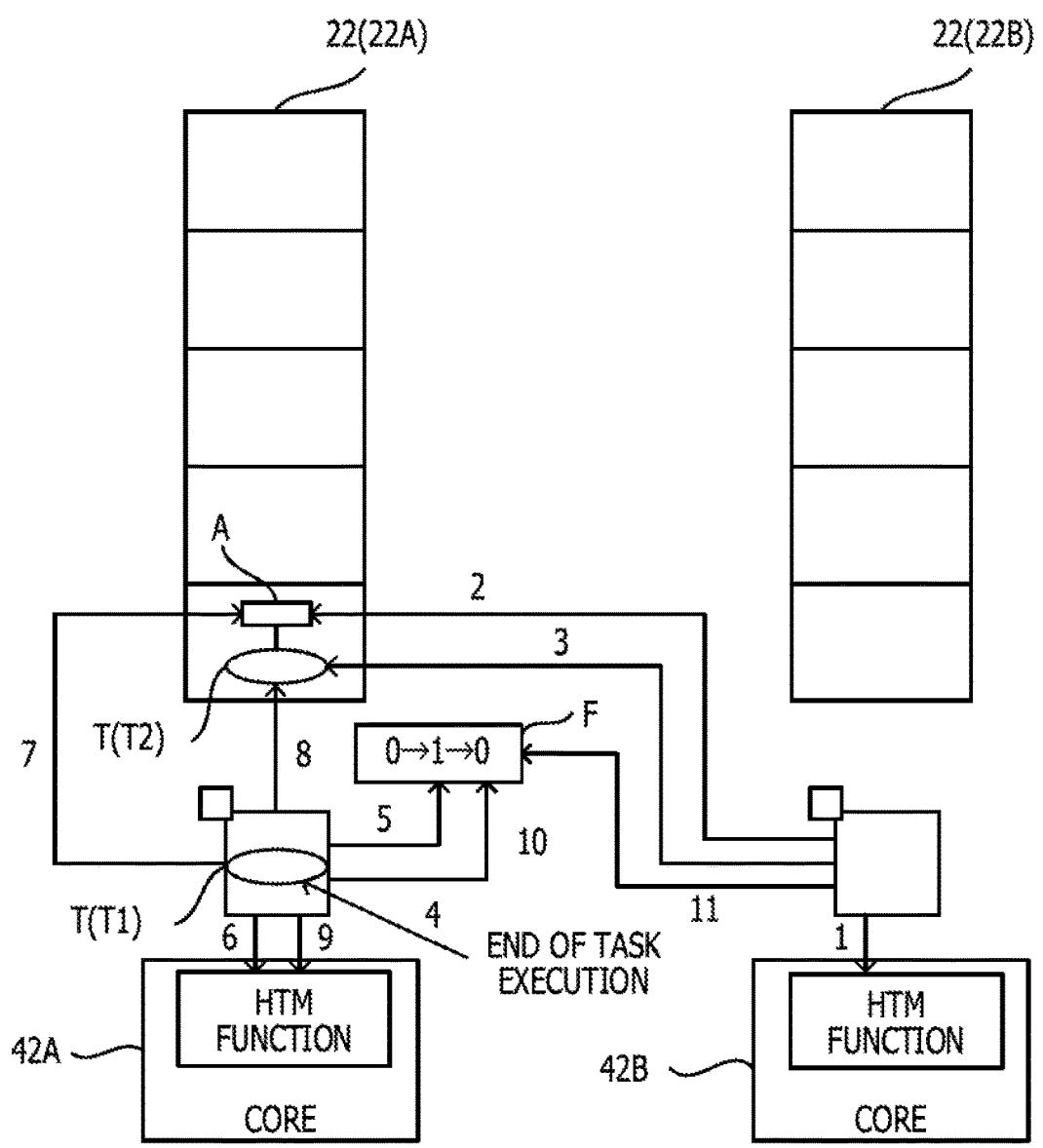
FIG. 15 depicts an example of a task execution process and a waiting process.

FIGS. 13 to 16 depict examples of a task execution process and a waiting process. Numerals added to arrow marks in respective FIGS. 13 to 15 represent an execution order of processes. Numerals added to the respective operations in FIG. 16 correspond to numerals added to the respective arrow marks in FIG. 15.

In FIG. 13, a case is illustrated in which the core 42A acquires a task T while work steal is not performed by a different core 42. As depicted in FIG. 13, since one task T is stored in the task queue 22A, the core 42A sets the flag F to "1" in operation 104 (1 in FIG. 13). The core 42A calls the HTM function of the core 42A and starts a transaction in operation 106 (2 in FIG. 13). The core 42A performs a reading process for the abort region A corresponding to the task T in operation 108 (3 in FIG. 13). The core 42A acquires the task T from the task queue 22A in operation 110 (4 in FIG. 13). The core 42A calls the HTM function of the core 42A and ends the transaction in operation 112 (5 in FIG. 13). The core 42A executes the task T in operation 116 after the core 42A sets the flag F to "0" in operation 114 (6 in FIG. 13).

In FIG. 14, another case is illustrated in which the core 42B performs work steal from the core 42A while the core 42A is executing a task T1 and the work steal ends without being abnormally ended. Since a task T is not stored in the task queue 22B and a task T2 is stored in the task queue 22A as depicted in FIG. 14, the core 42B calls the HTM function of the core 42B and starts a transaction in operation 124 (1 in FIG. 14). The core 42B performs a writing process for an abort region A corresponding to the task T2 in operation 126 (2 in FIG. 14). The core 42B acquires the task T2 from the task queue 22A in operation 128 (3 in FIG. 14). The core 42B calls the HTM function of the core 42B and ends the transaction in operation 130 (4 in FIG. 14), and then executes the task T2 in operation 132.

Figure 16:
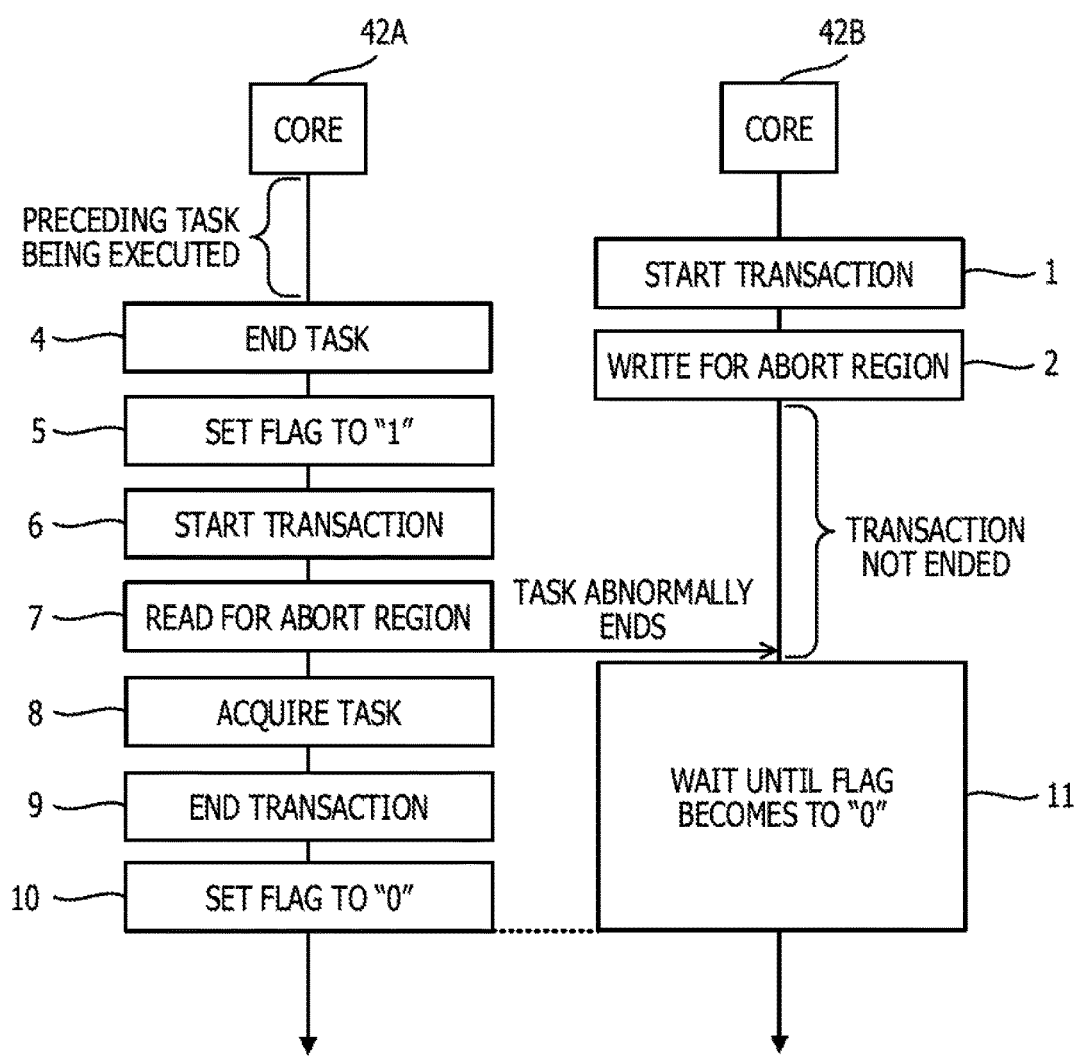
FIG. 16 depicts an example of a task execution process and a waiting process.

In FIGS. 15 and 16, a case is illustrated in which, while the core 42A is executing a task T1, the core 42B performs work steal from the core 42A and the work steal is ended abnormally. As illustrated in FIGS. 15 and 16, the core 42A executes processes from operation 104 to operation 116 and is executing the task T1.

Since a task T is not stored in the task queue 22B and a task T2 is stored in the task queue 22A, the core 42B calls the HTM function of the core 42B and starts a transaction in operation 124 (1 in FIG. 15). The core 42B performs a writing process for the abort region A corresponding to the task T2 in operation 126 (2 in FIG. 15). The core 42B acquires the task T2 from the task queue 22A in operation 128 (3 in FIG. 15).

For example, within a period after the core 42B starts acquisition of the task T2 from the task queue 22A until the transaction ends in operation 130 (for example, during execution of work steal), the execution of the task T1 comes to an end in the core 42A (4 of FIG. 15). When the execution of the task T1 comes to an end, the core 42A executes the processes at and after operation 100 again. Since one task T2 is stored in the task queue 22A, the core 42A sets the flag F to "1" in operation 104 (5 in FIG. 15).

The core 42A calls the HTM function of the core 42A and starts a transaction in operation 106 (6 in FIG. 15). The core 42A performs a reading process for the abort region A corresponding to the task T2 in operation 108 (7 in FIG. 15).

For example, the core 42A performs a reading process for the abort region A that corresponds to the task T2 whose work steal is being executed by the core 42B and besides for which the writing process is performed. Accordingly, since the condition of (3) described hereinabove is satisfied, the work steal being executed by the core 42B is abnormally ended (aborted) by the HTM function of the core 42B.

The core 42A acquires the task T2 from the task queue 22A by the process in operation 110 (8 in FIG. 15). The core 42A calls the HTM function of the core 42A and ends the transaction in operation 112 (9 in FIG. 15). The core 42A sets the flag F to "0" in operation 114 (10 in FIG. 15), and then executes the task T2 in operation 116.

If the work steal being executed is abnormally ended, the core 42B executes the waiting process described above and waits until the flag F of the core 42A becomes "0" by the process in operation 150 (11 in FIG. 15). For example, if the core 42B immediately starts execution of the task execution process after the work steal for the task T2 is abnormally ended, the core 42B may perform work steal for the task T2 again. In contrast, the core 42B waits until the flag F of the core 42A becomes "0" after the work steal being executed abnormally ends. For example, since the core 42B waits until the acquisition of the task T2 by the core 42A comes to an end, the possibility that the core 42B may perform work steal for the task T2 again decreases. Accordingly, unnecessary execution of work steal may be reduced.

When a first processor core acquires a task from a task queue of the first processor core, a reading process is performed for the abort region provided corresponding to the task of a target of the acquisition. When work steal for acquiring a task stored in the task queue of the first processor core is performed by a second processor core, a writing process is performed for the abort region. Accordingly, while the second processor core is performing work steal, the work steal is ended by the reading process by the first processor core. Since the task is executed by the first processor core, when work steal is performed, the decrease of the execution efficiency of the task may be reduced.

Although a task queue is applied as the storage region for a task, the application as the storage region for a task is not limited to this. For example, a stack may be applied as the storage region for a task.

Although, where one task T is stored in a task queue 22, the first core 42 performs a reading process for the abort region A for the task T, the reading process is not limited to this. For example, where a plurality of tasks T are stored in the task queue 22, the first core 42 may perform a reading process for the abort region A for each task T. In this case, for example, the first core 42 estimates an execution time period of task T based on task information of each task T stored in the task queue 22, a processing performance of the first core 42 and so forth. The first core 42 performs a reading process for the abort region A of each task T when the estimated execution time period is equal to or shorter than a given value. Consequently, work steal by the second core 42 for a task T whose execution ends in a comparatively sort period of time may decrease.

When work steal being executed by the second core 42 abnormally ends, waiting is performed until the flag F of the first core 42 changes to "0." However, the waiting is not limited to this. For example, when work steal being executed by the second core 42 abnormally ends, waiting for a given period of time may be performed. In this case, as the period for waiting, a period or the like may be applied which is determined by applying a margin to a period taken for acquisition of a task T by the first core 42 based on an experiment or the like in which, for example, an actual machine of the information processing apparatus 20 is used. For example, where there are a plurality of first cores 42, the second core 42 may not wait after work steal abnormally ends, but work steal may be performed for a first core 42 other than the first core 42 (for example, the core 42A) that is made a target of the work steal. For example, the second core 42 may wait until a task T is stored into the task queue 22 of the second core 42 itself after the work steal abnormally ends.

Figure 17:
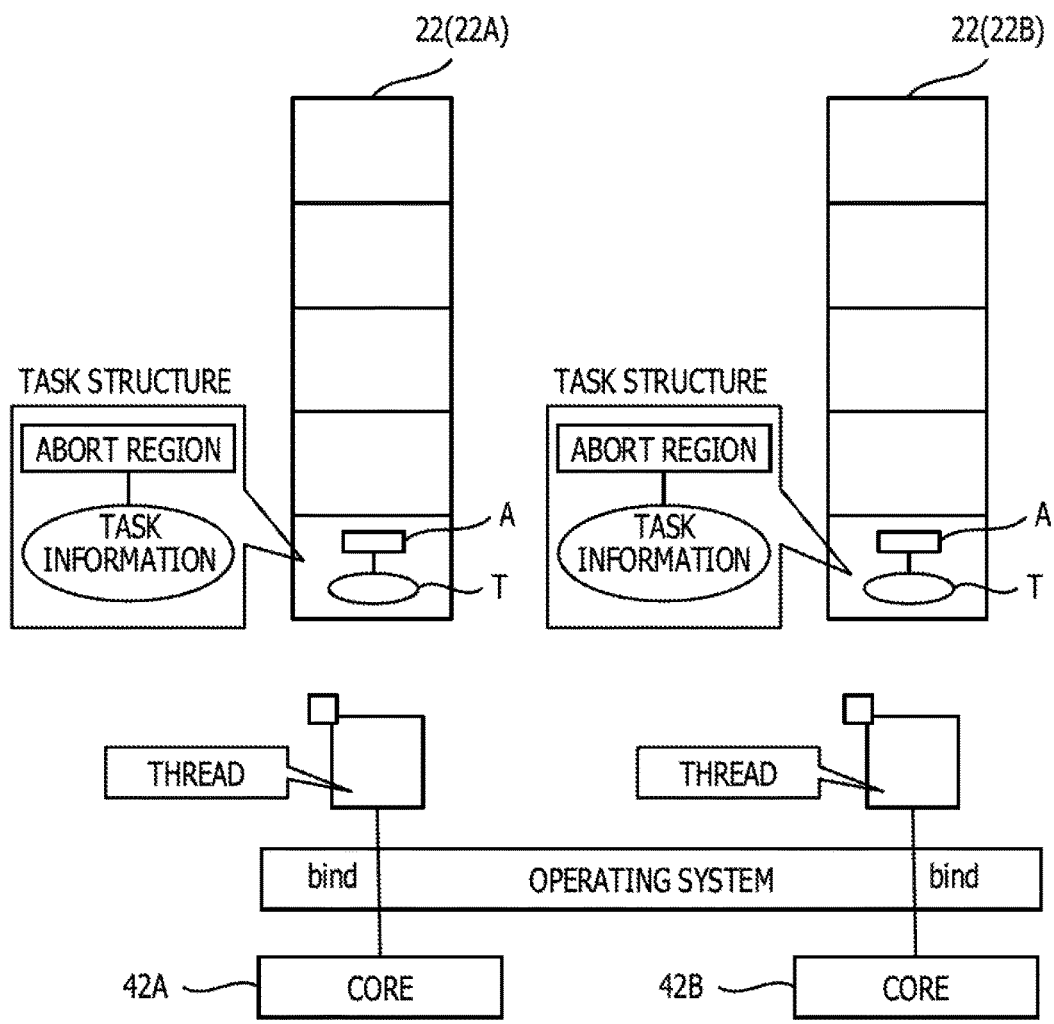
FIG. 17 depicts an example of a task queue by an application program.

Although the task queue 22 is implemented by a function of the OS, the implementation of the task queue 22 is not limited to this. For example, the task queue 22 may be implemented by an application program developed by a user. FIG. 17 depicts an example of a task queue by an application program. In this case, as an example, a thread of a user level may be allocated (bound) to each core 42 by the operating system as illustrated in FIG. 17.

Although an information processing program 60 is implemented as part of programs of the OS, the information processing program 60 is not limited to this. For example, the information processing program 60 may be implemented as an application program which operates on the OS.

Although work steal is abnormally ended using the HTM, the abnormal end is not limited to this. For example, work steal may be abnormally ended using the STM.

Although the information processing program 60 is stored (installed) in advance in the memory unit 44, provision of the information processing program 60 is not limited to this. The information processing program 60 may be provided in a form in which it is recorded in a recording medium such as a compact disc read-only memory (CD-ROM), a digital versatile disc (DVD)-ROM, a universal serial bus (USB) memory, or a memory card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a memory configured to store an information processing program; and
a plurality of processor cores configured to acquire and execute a task from a storage region which is provided for each of the processor cores and including a first processor core configured to execute the information processing program,
the first processor core:
performs, in work steal in which a task stored in a storage region of the first processor core is acquired by a second processor core, a writing process for an abort region, which is provided corresponding to the task, for detecting access contention by the first processor core and the second processor core using a transactional memory function;
performs a reading process for the abort region when the task is to be acquired from the storage region;
stores, after the first processor core performs the reading process, first information indicating that a transaction by the first processor core is being executed into a flag storage region provided corresponding to the first processor core and acquires the task; and
stores, after the acquisition of the task comes to an end, second information indicating that the transaction by the first processor core is not executed into the flag storage region,
when the reading process for the abort region is performed during execution of the work steal after the writing process is performed and the work steal comes to an end, the first processor core causes the second processor core to wait until the second information is stored into the flag storage region.

2. The information processing apparatus according to claim 1, wherein the first processor core: performs the reading process for the abort region when one task is stored in the storage region; and acquires the task from the storage region.

3. An information processing method comprising:
performing, by a first processor core included in a plurality of processor cores configured to acquire and execute a task from a storage region which is provided for each of the processor cores, in work steal in which a task stored in a storage region of the first processor core is acquired by a second processor core, a writing process for an abort region, which is provided corresponding to the task, for detecting access contention by the first processor core and the second processor core using a transactional memory function;

performing a reading process for the abort region when the task is to be acquired from the storage region;

storing, after the first processor core performs the reading process, first information indicating that a transaction by the first processor core is being executed into a flag storage region provided corresponding to the first processor core and acquires the task;

storing, after the acquisition of the task comes to an end, second information indicating that the transaction by the first processor core is not executed into the flag storage region; and causing, when the reading process for the abort region is performed during execution of the work steal after the writing process is performed and the work steal comes to an end, the second processor core to wait until the second information is stored into the flag storage region.

4. The information processing method according to claim 3, further comprising:

performing the reading process for the abort region when one task is stored in the storage region; and acquiring the task from the storage region.

5. A non-transitory computer-readable recording medium recording information processing program which caused a computer to perform a process, the process comprising:

performing, in work steal in which a task stored in a storage region of a first processor core, which is included in a plurality of processor cores configured to acquire and execute a task from the storage region which is provided for each of the processor cores, is acquired by a second processor core, a writing process for an abort region, which is provided corresponding to the task, for detecting access contention by the first processor core and the second processor core using a transactional memory function;

performing a reading process for the abort region when the task is to be acquired from the storage region;

storing, after the first processor core performs the reading process, first information indicating that a transaction by the first processor core is being executed into a flag storage region provided corresponding to the first processor core and acquires the task;

storing, after the acquisition of the task comes to an end, second information indicating that the transaction by the first processor core is not executed into the flag storage region; and causing, when the reading process for the abort region is performed during execution of the work steal after the writing process is performed and the work steal comes to an end, the second processor core to wait until the second information is stored into the flag storage region.

6. The non-transitory computer-readable recording medium according to claim 5, wherein the process includes: performing the reading process for the abort region when one task is stored in the storage region; and acquiring the task from the storage region.

* * * * *